US005921270A

United States Patent [19]

McCarty

[11] Patent Number: 5,921,270

[45] Date of Patent: Jul. 13, 1999

[54] AUTOMATIC FLUSH SYSTEM FOR WATER LINES

[76] Inventor: Wilfred L. McCarty, 731 Barron Chapel Rd., Pineville, La. 71360

[21] Appl. No.: 08/816,547

[22] Filed: Mar. 13, 1997

[51] Int. Cl.[6] .............................. B08B 9/06; F16K 31/02; F16L 59/16

[52] U.S. Cl. .......................... 137/240; 137/341; 137/343; 137/375; 137/382; 137/624.13; 251/129.04

[58] Field of Search .......................... 137/624.11, 624.13, 137/238, 62, 59, 363, 364, 37.5, 301, 294, 295, 266, 343, 356, 357, 371, 377, 381, 382, 599, 563, 341; 126/561, 569, 583

[56] References Cited

U.S. PATENT DOCUMENTS

| | | | |
|---|---|---|---|
| 2,327,121 | 8/1943 | McGay | 137/552.7 |
| 3,547,154 | 12/1970 | Benham | 137/624.11 |
| 4,147,157 | 4/1979 | Zekhariya | 126/271 |
| 4,256,133 | 3/1981 | Coward et al. | 137/624.11 |
| 4,336,792 | 6/1982 | Seiler | 126/420 |
| 4,453,534 | 6/1984 | Kazmir | 126/420 |
| 4,497,334 | 2/1985 | Wolf et al. | 137/209 |
| 4,696,324 | 9/1987 | Petronko | 137/375 |
| 4,726,394 | 2/1988 | Devine | 137/375 |
| 4,848,389 | 7/1989 | Pirkle | 137/357 |
| 5,184,571 | 2/1993 | Hostetler et al. | 119/72 |
| 5,287,876 | 2/1994 | Takahashi | 137/62 |
| 5,348,269 | 9/1994 | Moseley | 251/33 |
| 5,476,118 | 12/1995 | Yokoyama | 137/599 |

*Primary Examiner*—George L. Walton
*Assistant Examiner*—Bryan Wallace
*Attorney, Agent, or Firm*—L. Jager Smith, Jr.

[57] ABSTRACT

An automatic flushing system for municipal water systems. The system comprises flush piping connected to a municipal water system line, the flush piping having a solenoid valve mounted therein to permit periodic discharge of water from the municipal water system line. A programmable timer is provided to open and close the solenoid valve at predetermined times and for predetermined intervals. The system may be powered from a remote power source, or may be provided with a storage battery whose charge is maintained by a electricity generating solar panel.

13 Claims, 3 Drawing Sheets

AUTOMATIC FLUSH SYSTEM FOR WATER LINES

FIELD OF THE INVENTION

The present invention relates to a novel automatic flush system for use in municipal domestic water systems. Many municipal water systems include long segments of piping serving a small number of users, otherwise known as “dead end” segments of the piping system. The present invention provides a means of automatically flushing these dead end segments so that proper water quality is maintained for the end users.

BACKGROUND OF THE INVENTION

Many water systems are piped such that dead end segments exist in many places in the systems. Such would be the case for the piping going to the last house or other water user in a rural area served by the water system. Any piping beyond the last user will contain essentially stagnant water. Further, the water upstream of the last users will be stagnant to the extent that the last users do not consume the water. Stagnation of this water may permit increases in concentrations of biological organisms, because the organisms are not flushed out regularly. Furthermore, any chemical treatment provided in the water system to inhibit the proliferation of biological organisms may decrease in potency and ability to control such organisms when left in stagnant water. As the duration of stagnation of the water increases, and the free oxygen in the water decreases as a result of bonding in corrosion and of consumption by aerobic bacteria, anaerobic bacteria may increase in number, producing byproducts that may foul the water supply.

A further problem associated with the stagnation of the domestic water supply is the leaching of metals in the piping system into the water. Although in a municipal water system where the water is continually flowing this leaching may not be a concern, in dead end segments, the water may stand long enough for unacceptable quantities of metals to leach out into the water. Perhaps of greatest concern is the leaching into the water of lead that has been used in many systems in years past at joints in the piping system. Studies now clearly indicate that even small quantities of lead ingested by children can impose irreparable developmental damage to them. Iron, copper, and their oxides that leach into the water may affect the taste and appearance of the water, and in certain quantities, may render the water unfit for human consumption.

The water in dead end segments of municipal water systems needs to be flushed out periodically so that proper water chemistry is maintained in the dead end, and so that the last users' water supply does not become unusable by virtue of the increase in concentration of biological organisms, leachates and other impurities that may exist in stagnant water. In many municipal systems, this is accomplished by maintenance personnel periodically opening fire hydrants and other valves in the water system to allow a flushing water stream to purge the dead end segments. Unfortunately, however, with manpower limitations, and the inability to conduct such flushing on a rigorous schedule, the flushing operation may frequently be neglected. Moreover, the manual flushing is most likely to be accomplished during normal working hours, when water demand may be high and when significant flushing may tax the capacity of the municipal water system.

What is needed is an automatic flushing system that does not depend on a human attendant to begin and stop the flushing operation. The system should permit flushing at predetermined times and for predetermined durations, such that flushing may be accomplished off of the peak demand times on the municipal water system. Other flushing systems are known, such as that disclosed in U.S. Pat. No. 5,184,571 to Hostetler for use in watering systems for chickens or small animals. U.S. Pat. No. 5,476,118 to Yokoyama involves a system for eliminating stagnation in a super pure water system. These flushing systems are not adapted to provide a timed flush of dead end segments of municipal water systems.

It is accordingly on object of the present invention to provide an automatic flushing system suitable for installation in the supply piping of municipal water systems to accomplish preprogrammed flushing of the affected water piping. It is a further object of the invention to provide an automatic flushing system of relatively simple construction, and made of durable components. A further object of the invention is to provide an automatic flushing system that does not require an electric power source to be run to the location in which it is installed.

SUMMARY OF THE INVENTION

The present invention involves an automatic system for flushing stagnant municipal water supply lines. The automatic flushing system is tied into the water line at the end of the dead run of piping (or anywhere else in the system it is desired to be installed). The invention's piping includes a solenoid valve that is powered through an electric timer. The timer can be programmed to open the solenoid valve at predetermined times, for predetermined durations. For example, the timer may be set to open the solenoid valve, and thereby flush the water out of the dead end piping, at 3:00 A.M. once a week for a 30 minute period. The duration of the flushing operation can be determined by calculating the amount of water desired to be flushed through the piping, and dividing this quantity by the discharge rate of the solenoid valve at the system pressure. The start and stop times can be adjusted according to the needs of the user within the limitations of the available timer programmability. The valving, controls and power source for the system are located within an accessible, weather-resistant cabinet.

Because the dead ends of municipal water systems are often located in remote areas away from power sources, an embodiment of the invention includes a electricity generating solar panel on top of the cabinet which provides a trickle charge through a voltage regulator to a storage battery. The storage battery provides the power source for the timer and solenoid valve. Alternatively, the invention may be supplied with alternating current if available. If alternating current is available, a thermostatically controlled heating element may be included in the invention's cabinet to preclude freezing of water lines in the cabinet during cold weather.

The preferred embodiment employs a solenoid valve that is normally closed by means of a spring return. Force from the solenoid is required to open the valve for the flushing operation. The use of a normally closed valve reduces power requirements that otherwise would be necessary to hold the valve closed, and ensures that upon failure of the flushing system power supply, the municipal water system is not subjected to an unchecked discharge.

BRIEF DESCRIPTION OF THE DRAWINGS

The organization and manner of the structure and operation of the invention, together with further advantages thereof, may be best understood by reference to the following description, taken in connection with the accompanying drawings, wherein like reference numerals identify like elements, in which.

DETAILED DESCRIPTION OF SPECIFIC EMBODIMENTS OF THE INVENTION

Figure 1:
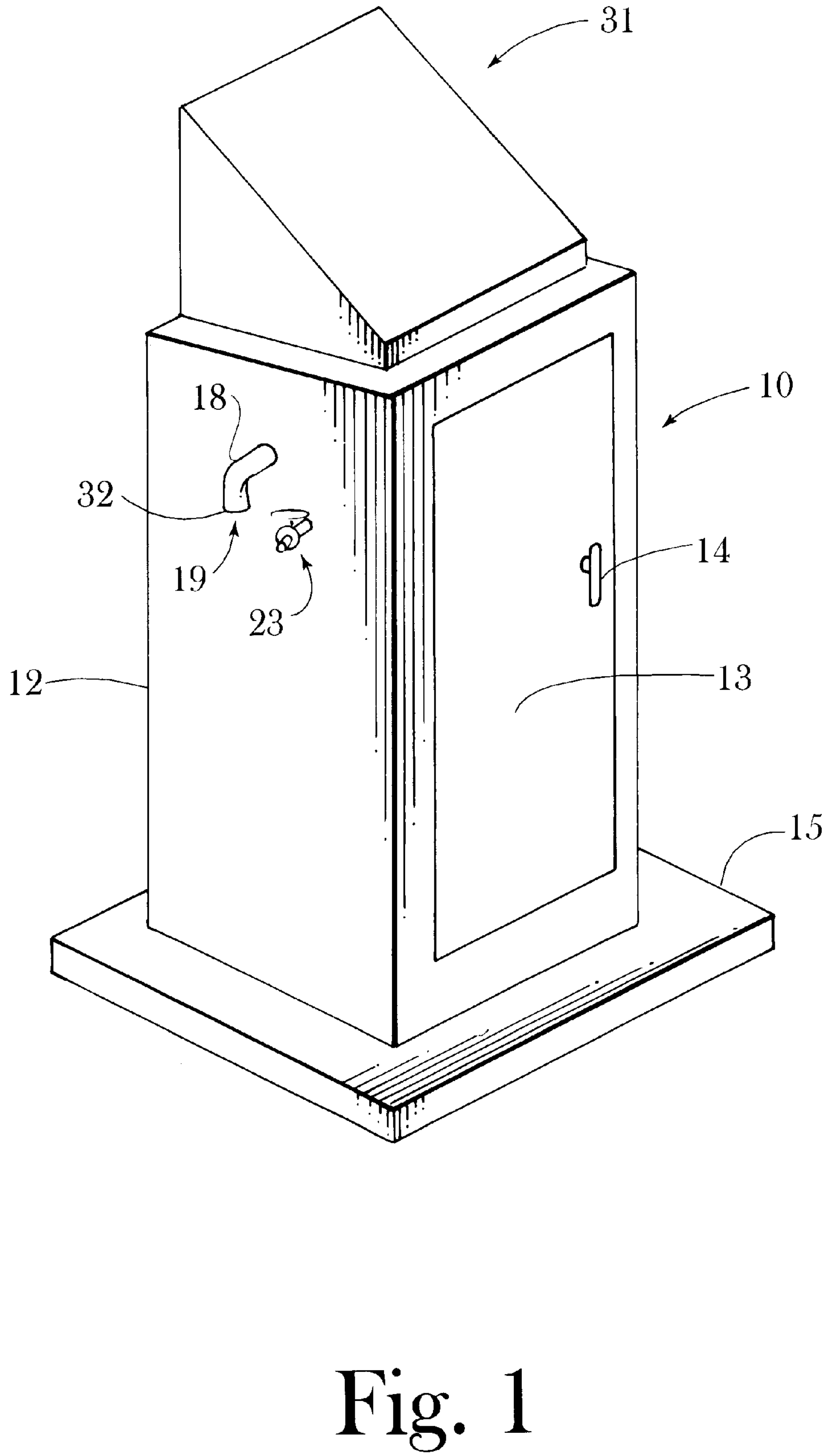
FIG. 1 is a perspective view of the automatic flushing system within its cabinet.

Referring to FIG. 1, a perspective drawing of the automatic flushing system 10 is shown. Most of the components of the system are located within cabinet 12, which includes cabinet door 13 with latch 14. Preferably, latch 14 may be locked to prevent unauthorized access into the system. Cabinet 12 may be lined with thermal insulation 35, such as fiberglass or polystyrene, to minimize the danger of freezing of the water-bearing piping in the cabinet. Furthermore, if an adequate power supply is available, the cabinet may be fitted with a thermostatically controlled heater 34 to prevent freezing of piping when the system is installed in frigid climates. The automatic flushing system 10 may be installed on a concrete pad, such as pad 15, to stabilize the installation and to provide a more finished appearance. On the embodiment shown in FIG. 1 is mounted an electricity generating solar panel 31. Solar panel 31 provides energy to maintain the charge on a battery within the cabinet whose function is to power a timer and a solenoid valve.

On the side of cabinet 12 can be seen the discharge elbow 18 at the discharge end 32 of the flush piping. When the flushing operation is in progress, the flush water discharges through elbow 18 wherein positive operation of the system can be verified by an observer. Insofar as possible, elbow 18 should be mounted above the level of any local flooding to minimize the possibility of backflow into the municipal water system in the event of loss of municipal water system pressure during a flood. Insect screen 19 may be installed over the discharge of elbow 18 if desired to minimize any obstructions that might be caused by insects or their dwellings. If used, insect screen 19 must be coarse enough so that no significant obstruction to the water flow is presented by insect screen 19.

Figure 2:
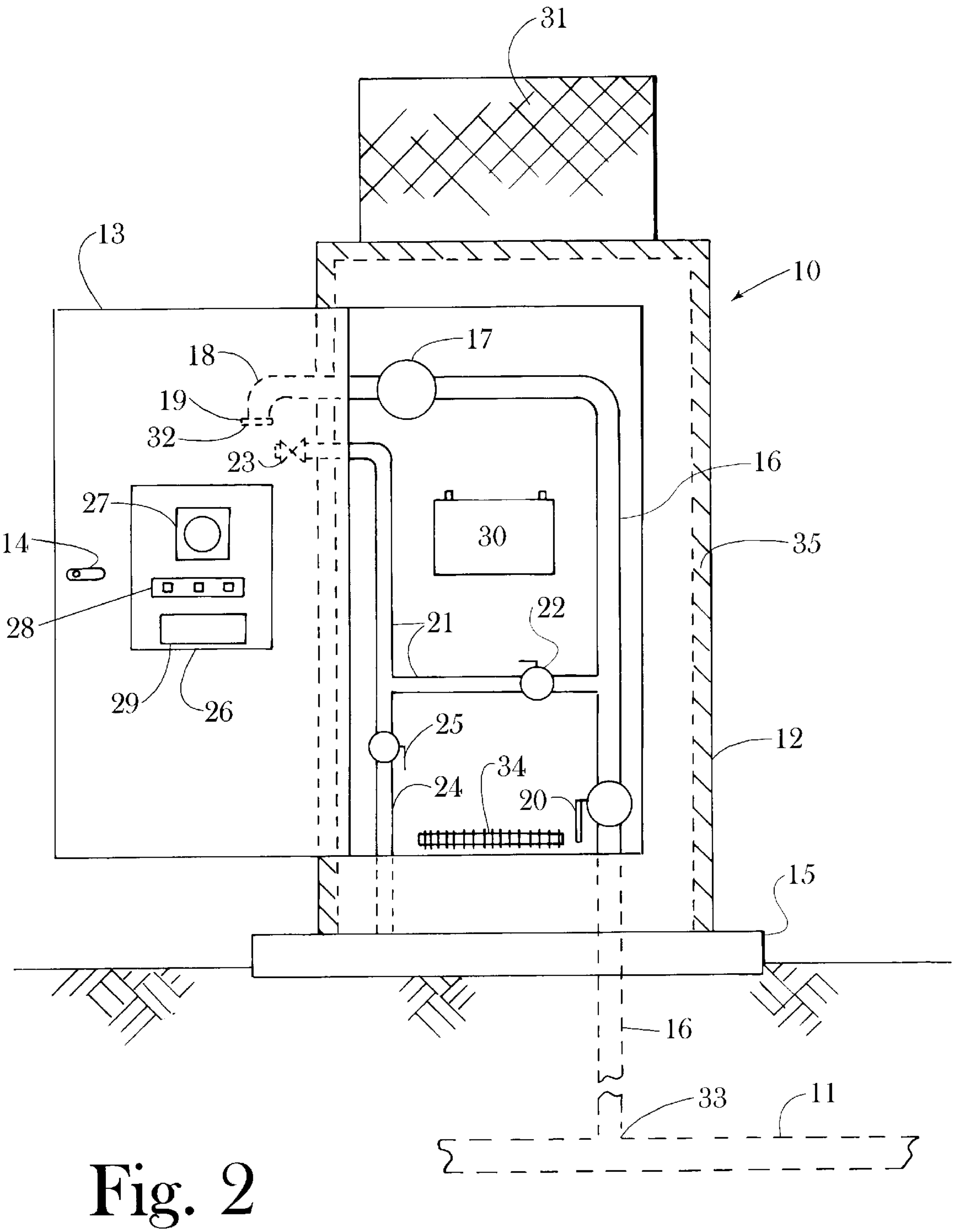
FIG. 2 is an elevation of the automatic flushing system with the cabinet door open, showing the piping and elements within the cabinet.

Turning now to FIG. 2, an elevation of the automatic flushing system 10 is presented. In FIG. 2, cabinet door 13 is open, and the internals of the system may be viewed. The cabinet door latch 14, which may be lockable, is also shown. The piping for the automatic flushing system includes the flush piping 16 which is connected at its inlet end 33 to the municipal water system piping 11 desired to be flushed periodically. The flush piping 16 preferably rises through the pad 15 so that the piping is fully contained within cabinet 12, however, it is not necessary to bring the flush piping in through the bottom of the cabinet, inasmuch as the system may be piped such that the flush piping is brought into the cabinet through the side of the cabinet.

Tracing the flush piping 16 from the connection to the municipal water system piping 11, the next component in the flush piping 16 is the flush piping shutoff valve 20. Flush piping shutoff valve 20 permits isolation of the entire automatic flushing system piping from the municipal water system piping for service. Flush piping shutoff valve 20 may be of any type valve suitable for shutoff service, such as a ball valve or a gate valve, and is preferably a low pressure drop valve. Continuing along the path of flush piping 16, the next component is the solenoid valve 17. Solenoid valve 17 may be of any design suitable for positive shutoff of the water supply against system pressure. The solenoid on valve 17 should be provided with power requirements consistent with the available power supply, such as 12 or 24 volts direct current or 120 volts alternating current. Downstream of solenoid valve 17 is discharge elbow 18, designed to direct flushing flow out of the cabinet and toward the ground out the discharge end 32 of flush piping 16. As also shown in FIG. 1, an insect screen 19 may be installed over the outlet of the discharge elbow 18.

As an aid to municipal water supply officials who must periodically sample and test the water supply, the automatic flushing system may be provided with test piping 21, which is connected to the flush piping 16 between the flush piping shutoff valve 20 and the solenoid valve 17. Test piping 21 is routed through test piping shutoff valve 22 through the outside of cabinet 12, where it terminates at the test piping sample valve 23. The test piping shutoff valve 22 may be of any type valve suitable for positive water shutoff, such as a gate or ball valve. The test piping sample valve 23 may similarly be of any type valve suitable for positive water shutoff, although local code officials may require the sample valve 23 have no threads for external connection of a hose, and may further require the sample valve 23 to be chrome plated. Because municipal water system pressures are generally always adequate to induce more than enough flow through the test piping, the pressure drop through the test piping shutoff valve and the test piping sample valve is not usually an important consideration, and higher pressure drop valves such as globe valves may be used in those applications if desired and permitted by local code officials.

Connected to the test piping 21 is the test piping drain 24, within which is located test piping drain shutoff valve 25. Test piping drain 24 may be terminated at any suitable discharge point for water, such as outside cabinet 12. During periods of cold weather, municipal water officials may desire to drain the test piping 21 by closing test piping shutoff valve 22 and opening test piping drain shutoff valve 25 to preclude freezing of test piping 21.

In the embodiment illustrated in FIG. 2, a control panel 26 is mounted on the inside of cabinet door 13, upon which is mounted a timer 27, a switch bank 28, and a voltage regulator 29. A storage battery 30 is shown mounted to the rear wall of cabinet 12. The placement within the cabinet of the control panel and the storage battery may be altered as desired. Furthermore, the elements illustrated on the control panel 26 in FIG. 2 may be separately mounted at different locations within the cabinet as desired by the user. Timer 27 should be programmable to open and close a power circuit to the solenoid of solenoid valve 17 at predetermined times and for predetermined intervals, thereby permitting water system flushing at said predetermined times.

Solar panel 31, preferably mounted on the top of cabinet 12 is wired through voltage regulator 29 to the storage battery 30. During daylight hours, therefore, the charge on storage battery 30 is replenished. Solar panel 31 is preferably oriented in such a direction on the top of cabinet 12 that maximum solar incidence is achieved, maximizing the potential charging of storage battery 30.

Figure 3:
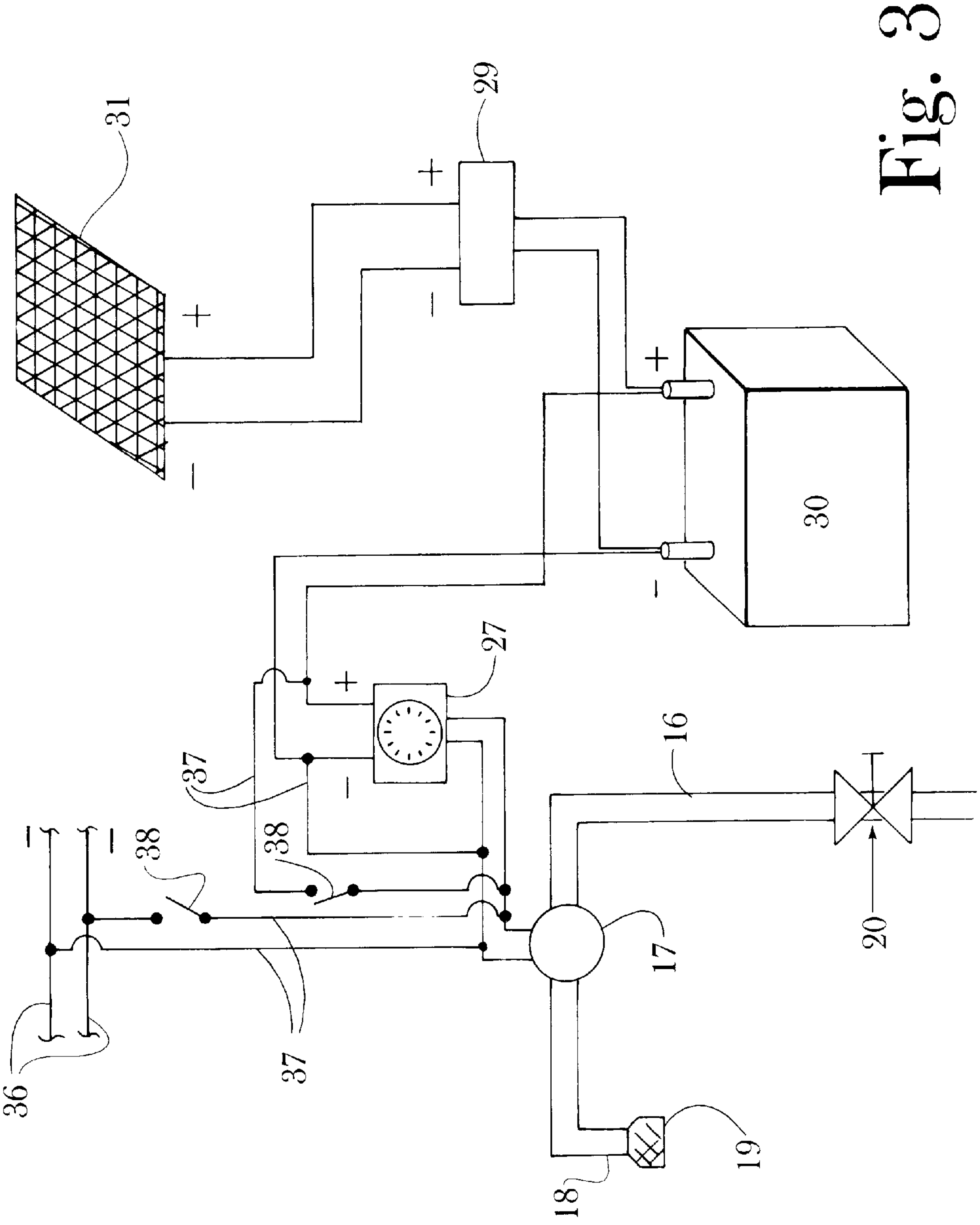
FIG. 3 is a schematic of the wiring system that may be used with an embodiment of the automatic flushing system having a storage battery that is charged by an electricity generating solar panel.

Turning now to FIG. 3, an elementary wiring diagram for an embodiment of the automatic flush system is shown. The storage battery 30 can be seen to be charged by solar panel

31 through voltage regulator 29. Power from the storage battery 30 is run through timer 27 to solenoid valve 17. At predetermined times, timer 27 closes the circuit between storage battery 30 and solenoid valve 17, thereby powering open solenoid valve 17 for water line flushing. In systems where a storage battery is not used, an alternative power source 36 may be brought directly to the timer. A bypass circuit 37, with a switch 38, may also be provided directly between the storage battery 30 or alternate power source 36 and the solenoid valve 17. Where such circuit is provided, the user may electrically open the solenoid valve by closing the switch in the said circuit, bypassing the timer function. Other switches may be provided to open the electrical circuits shown in FIG. 3 as desired, such as switches to electrically isolate the storage battery or alternate power source, the timer, the voltage regulator, or the solar panel. Such switches should be wired into the circuits between the elements so identified.

From the foregoing detailed description of specific embodiments of the invention, it should be apparent that a novel and useful automatic flushing system for municipal water systems has been disclosed. While specific embodiments of the invention have been described in detail, it is to be understood that various alterations, substitutions and modifications can be made therein without departing from the spirit and scope of the present invention as defined in the appended claims.

I claim:

1. An automatic flushing system, comprising:

(a) flush piping connected to a municipal water system line, having an inlet end connected to the municipal water system line and an outlet end;

(b) a flush piping shutoff valve mounted in the flush piping between the inlet end and the outlet end;

(c) a solenoid valve mounted in the flush piping between the flush piping shutoff valve and the outlet end of the flush piping;

(d) means for automatically opening and closing the solenoid valve at predetermnined times and for predetermined intervals; and (e) test piping connected to the flush piping between the flush piping shutoff valve and the solenoid valve for testing water from the municipal water system line, the test piping being routed to a test piping sample valve for sampling water from the municipal water system line, and the test piping being provided with a test piping shutoff valve in said piping between the flush piping and the test piping sample valve.

2. The automatic flushing system according to claim 1, further comprising a cabinet within which the flush piping, flush piping shutoff valve and solenoid valve are located, the cabinet having a door with a latch permitting access to said piping and valves.

3. The automatic flushing system according to claim 2, wherein the cabinet is lined with thermal insulation.

4. The automatic flushing system according to claim 2, further comprising a thermostatically controlled heater mounted within the cabinet.

5. The automatic flushing system according to claim 2, wherein the means for automatically opening and closing the solenoid valve is a programmable electric timer.

6. The automatic flushing system according to claim 2, wherein a storage battery provides power to open and close the solenoid valve.

7. The automatic flushing system according to claim 6, wherein an electricity generating solar panel mounted on the cabinet and wired through a voltage regulator provides power to maintain the charge on the storage battery.

8. The automatic flushing system according to claim 2, wherein power is provided through wiring to open and close the solenoid valve from a source remote from the automatic flushing system.

9. The automatic flushing system according to claim 1, wherein the test piping is provided with a test piping drain line connected to the test piping between the test piping shutoff valve and the test piping sample valve, said test piping drain line being routed to a suitable water discharge point.

10. The automatic flushing system according to claim 6, further comprising an electrical switch in the wiring between the storage battery and the solenoid valve.

11. The automatic flushing system according to claim 8, further comprising an electrical switch in the wiring between the remote power source and the solenoid valve.

12. The automatic flushing system according to claim 6, further comprising a bypass circuit connected between the storage battery and the solenoid valve, with a switch in said bypass circuit.

13. The automatic flushing system according to claim 8, further comprising a bypass circuit connected between the remote power source and the solenoid valve, with a switch in said bypass circuit.

* * * * *